(12) United States Patent
Yoon

(10) Patent No.: US 11,925,217 B2
(45) Date of Patent: Mar. 12, 2024

(54) RECHARGING SYSTEM FOR AEROSOL GENERATING DEVICE

(71) Applicant: KT&G CORPORATION, Daejeon (KR)

(72) Inventor: Sung Wook Yoon, Suwon-si (KR)

(73) Assignee: KT&G CORPORATION, Daejeon (KR)

( * ) Notice: Subject to any disclaimer, the term of this patent is extended or adjusted under 35 U.S.C. 154(b) by 870 days.

(21) Appl. No.: 16/971,840

(22) PCT Filed: Apr. 24, 2020

(86) PCT No.: PCT/KR2020/005455
§ 371 (c)(1),
(2) Date: Aug. 21, 2020

(87) PCT Pub. No.: WO2020/218885
PCT Pub. Date: Oct. 29, 2020

(65) Prior Publication Data
US 2023/0110163 A1    Apr. 13, 2023

(30) Foreign Application Priority Data
Apr. 25, 2019    (KR) .................. 10-2019-0048609

(51) Int. Cl.
*A24F 40/95*    (2020.01)
*A24F 40/40*    (2020.01)
*A24F 40/70*    (2020.01)

(52) U.S. Cl.
CPC ............. *A24F 40/95* (2020.01); *A24F 40/40* (2020.01); *A24F 40/70* (2020.01)

(58) Field of Classification Search
None
See application file for complete search history.

(56) References Cited

U.S. PATENT DOCUMENTS 11,337,464 B2 *    5/2022    Lee .................. A24F 40/95
2004/0239292 A1    12/2004    Lie
(Continued)

FOREIGN PATENT DOCUMENTS

CN    201571500 U    9/2010
CN    207836767 U    9/2018
(Continued)

OTHER PUBLICATIONS

Office Action dated Feb. 18, 2023 from the Chinese Patent Office in Application No. 202080001774.X.
(Continued)

*Primary Examiner* — Ross N Gushi
(74) *Attorney, Agent, or Firm* — Sughrue Mion, PLLC

(57) ABSTRACT

A recharging system includes a first case; a second case coupled to the first case to form the inner space; a first plate that is disposed in the first case; and a second plate that is disposed in the second case, wherein the first plate and the second plate are formed of a thermally conductive material, and wherein at least one end of the first plate is exposed out of the first case and at least one end of the second plate is exposed out of the second case, such that the exposed end of the first plate and the exposed end of the second plate are in contact with each other when the first case and the second case are coupled to each other.

7 Claims, 16 Drawing Sheets

(56) References Cited

U.S. PATENT DOCUMENTS

| | | |
|---|---|---|
| 2015/0040925 A1 | 2/2015 | Saleem et al. |
| 2018/0338386 A1* | 11/2018 | Chen .................... H05K 9/0047 |
| 2019/0380390 A1 | 12/2019 | Jeong et al. |
| 2022/0087310 A1 | 3/2022 | Han et al. |
| 2022/0087311 A1 | 3/2022 | Han et al. |

FOREIGN PATENT DOCUMENTS

| | | | |
|---|---|---|---|
| CN | 208192124 U | 12/2018 | |
| JP | 2002-374087 A | 12/2002 | |
| JP | 3212997 U | 10/2017 | |
| JP | 3218380 U | 10/2018 | |
| KR | 10-2016-0116991 A | 10/2016 | |
| KR | 10-1733448 B1 | 5/2017 | |
| KR | 200484214 Y1 | 8/2017 | |
| KR | 1020180085340 A | 7/2018 | |
| KR | 10-2018-0122798 A | 11/2018 | |
| WO | 2018/202732 A1 | 11/2018 | |
| WO | WO2018/217030 * | 11/2018 | ............... H05K 7/20 |

OTHER PUBLICATIONS

Communication dated Oct. 5, 2020, from the Korean Intellectual Property Office in application No. 10-2019-0048609.
International Search Report dated Oct. 20, 2020, in International Application No. PCT/KR2020/005455.
Extended European Search Report dated Oct. 29, 2021 in European Application No. 20751059.5.

* cited by examiner

RECHARGING SYSTEM FOR AEROSOL GENERATING DEVICE

CROSS REFERENCE TO RELATED APPLICATIONS

This application is a National Stage of International Application No. PCT/KR2020/005455 filed Apr. 24, 2020, claiming priority based on Korean Patent Application No. 10-2019-0048609 filed Apr. 25, 2019.

TECHNICAL FIELD

The present disclosure relates to a recharging system for an aerosol generating device, and more particularly, to a recharging system for an aerosol generating device that may protect a user from burning when using an aerosol generating device.

BACKGROUND ART

In recent years, demands for alternative cigarettes have been increased. For example, demands for an aerosol generating device that generates aerosol by heating an aerosol generating material in the cigarette, rather than by combusting the cigarette, have been increased.

Generally, an aerosol generating device may be recharged by a separate power supply device after being used for a certain period of time. In addition, the aerosol generating device may also operate based on power supplied from the power supply device while being coupled to the power supply device.

However, when the aerosol recharging system is coupled to an external power supply device for recharging shortly after the aerosol generating device is used, a user may suffer thermal injury or have discomfort because of residual heat generated by the aerosol generating device, heat generated by a heater included in the aerosol generating device when the aerosol generating material is heated in a state in which the aerosol generating device and a power supply device are coupled to each other, or heat generated by the aerosol generating device and/or the power supply device when the aerosol generating device is recharged.

In order to solve this problem, a case of a power supply device may be include a heat dissipation member and/or a shield member. However, a process of forming the heat dissipation member or the shield member is disposed at the end of the manufacturing process, which makes the manufacturing process more complicated.

DISCLOSURE

Technical Solution

A technical object of the present disclosure is to provide an aerosol recharging system capable of protecting a user from thermal injury when the aerosol recharging system is used.

A recharging system for an aerosol generating device according to an embodiment of the present disclosure for solving the above-described technical problems includes an aerosol generating device that generates aerosol by heating an aerosol generating material; and a power supply device having an inner space into which the aerosol generating device is inserted, wherein the power supply device comprises: a first case; a second case coupled to the first case to form the inner space; a first plate that is disposed in the first case; and a second plate that is disposed in the second case, wherein the first plate and the second plate are formed of a thermally conductive material, and wherein at least one end of the first plate is exposed out of the first case and at least one end of the second plate is exposed out of the second case, such that the exposed end of the first plate and the exposed end of the second plate are in contact with each other when the first case and the second case are coupled to each other.

Advantageous Effects

Since a recharging system for an aerosol generating device according to the present disclosure includes a plate integrated with a case, a user may be protected from thermal injury when the aerosol recharging system is used.

In addition, the recharging system for the aerosol generating device may be designed to have a double-plate structure, and the heat insulation effect is further enhanced by an inner air layer between the double plates.

Effects of the present disclosure are not limited by the content described above, and more various effects may be obtained by the embodiments described herein.

BEST MODE

Figure 1:
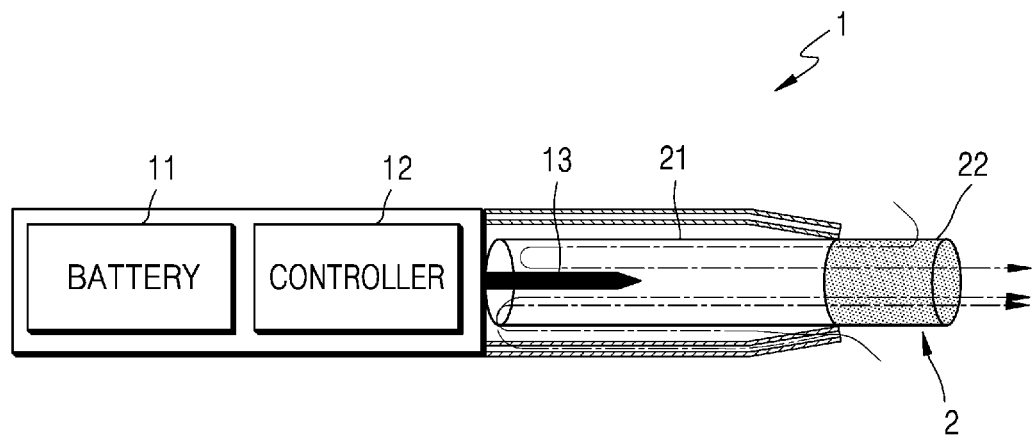
FIGS. 1 to 3 are views illustrating examples in which a cigarette is inserted into an aerosol generating device.

A recharging system for an aerosol generating device according to an embodiment may include an aerosol generating device that generates aerosol by heating an aerosol generating material; and a power supply device having an inner space into which the aerosol generating device is inserted, wherein the power supply device comprises: a first case; a second case coupled to the first case to form the inner space; a first plate that is disposed in the first case; and a second plate that is disposed in the second case, wherein the first plate and the second plate are formed of a thermally conductive material, and wherein at least one end of the first plate is exposed out of the first case and at least one end of the second plate is exposed out of the second case, such that the exposed end of the first plate and the exposed end of the second plate are in contact with each other when the first case and the second case are coupled to each other.

The exposed end of the first plate and the exposed end of the second plate may overlap each other in an outward direction when the first case and the second case are coupled to each other.

The exposed end of the first plate may include a protrusion extending in an outward direction, and the exposed end of the second plate includes a groove accommodating the protrusion.

The aerosol generating device may further include a third plate disposed in the first case such that an inner layer is formed between the first plate and the third plate, wherein the exposed end of the first plate is connected to the third plate, such that a connected portion of the first plate and the third plate is connected to the second case and overlaps the second plate in an outward direction when the first case and the second case are coupled to each other.

The aerosol generating device may further include a fourth plate disposed in the second case such that an inner layer is formed between the fourth plate and the second plate, wherein the exposed end of the first plate is connected to the third plate and the exposed end of the second plate is connected to the fourth plate, such that a connected portion of the first plate and the third plate is in contact with a connected portion of the second plate and the fourth plate when the first case and the second case are coupled to each other. Accordingly, an aerosol-generating device of the present disclosure is further strengthened in a thermal insulation effect by an air layer formed by the first to fourth plates.

At least one of the first plate and the second plate may include an exposure portion that is exposed to the inner space at a location corresponding to a heat source.

In addition, the first plate is molded between an outer surface and an inner surface of the first case by an insert injection process, and the second plate is molded between an outer surface and an inner surface of the second case by the insert injection process.

In addition, each of the first plate and the second plate has a through-hole penetrating a top and a bottom so that an injection material enters, during injection molding.

In addition, each of the first plate and the second plate includes a coupling protrusion coupled to an injection material during injection molding on an upper surface or a lower surface.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which example embodiments of the present disclosure are shown such that one of ordinary skill in the art may easily work the present disclosure. The disclosure may, however, be embodied in many different forms and should not be construed as being limited to the embodiments set forth herein.

Figure 2:
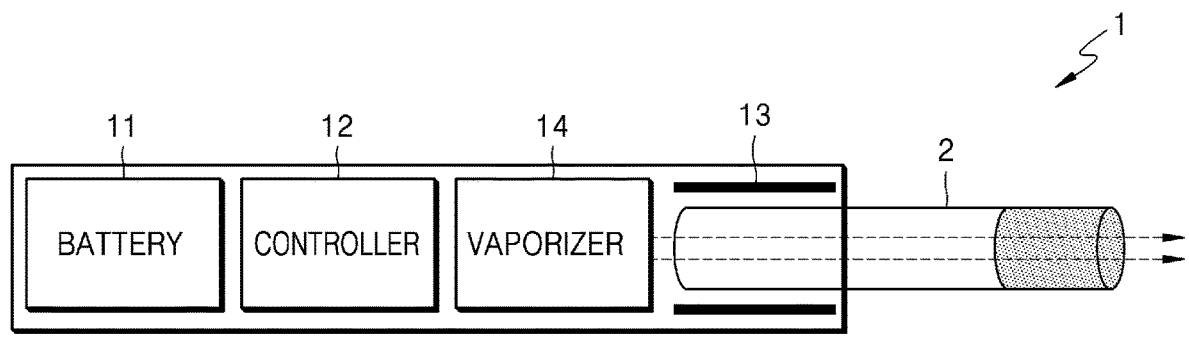
Figure 3:
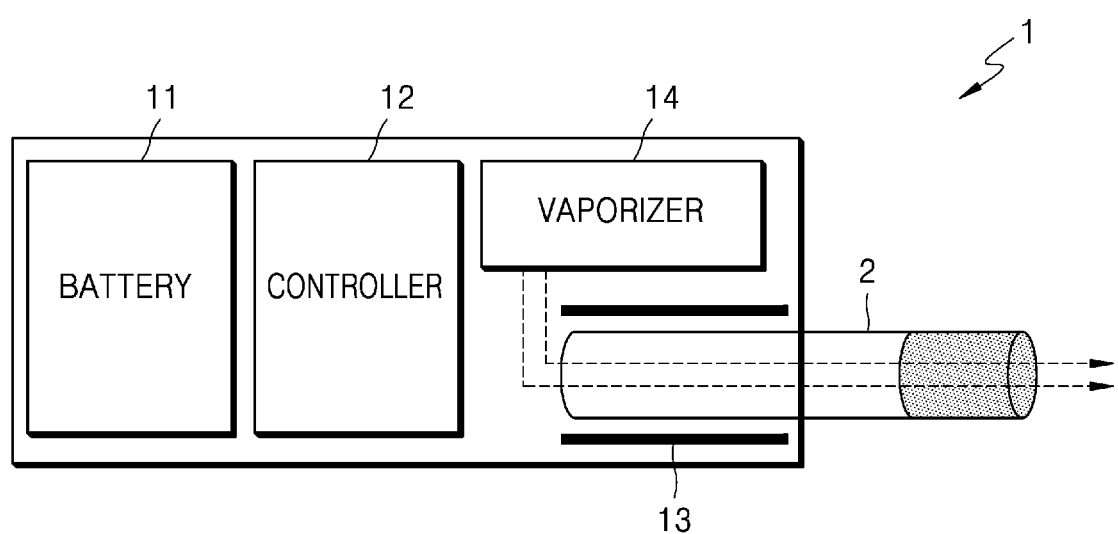

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate an aerosol from the cigarette 2 and/or the vaporizer 14. The aerosol generated by the heater 13 and/or the vaporizer 14 is delivered to a user by passing through the cigarette 2.

According to necessity, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Vitamin mixtures may be a mixture of at least one of vitamin A, vitamin B, vitamin C, and vitamin E, but are not limited thereto.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include other components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (e.g., a puff detecting sensor, a temperature detecting sensor, a cigarette insertion detecting sensor, etc.). Also, the aerosol generating device 1 may be formed as a structure where, even when the cigarette 2 is inserted into the aerosol generating device 1, external air may be introduced or internal air may be discharged.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar to a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1. Otherwise, the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage may be adjusted by the user. Accordingly, the amount and smoothness of smoke may be adjusted by the user. As another example, the external air may flow into the cigarette 2 through at least one hole formed in a surface of the cigarette 2.

Hereinafter, an example of the cigarette 2 will be described with reference to FIG. 4.

Figure 4:
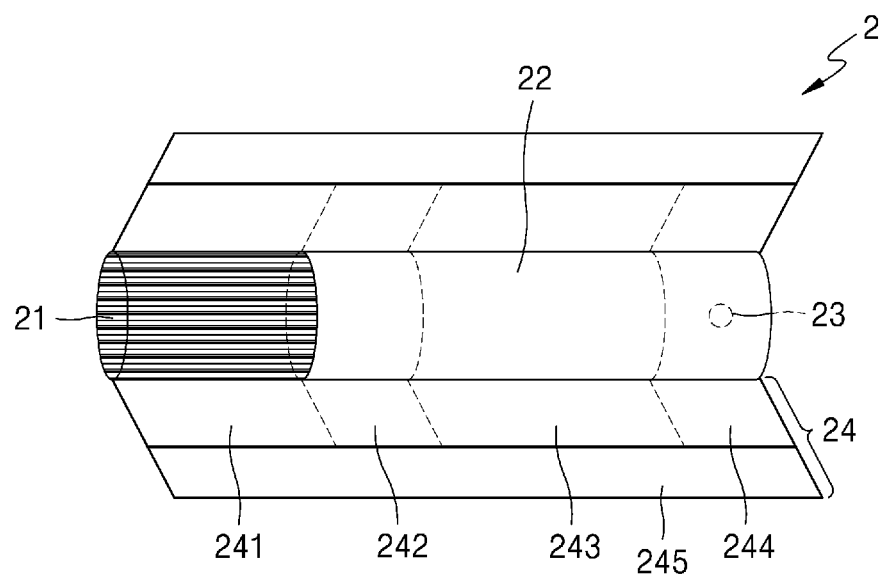
FIGS. 4 and 5 are views illustrating examples of a cigarette.

FIG. 4 illustrates an example of a cigarette.

Referring to FIG. 4, the cigarette 2 may include a tobacco rod 21 and a filter rod 22. The first portion 21 described above with reference to FIGS. 1 through 3 may include the tobacco rod, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a first segment configured to cool an aerosol and a second segment configured to filter a certain component included in the aerosol. Also, as necessary, the filter rod 22 may further include at least one segment configured to perform other functions.

The cigarette 2000 may be packaged using at least one wrapper 24. The wrapper 24 may have at least one hole through which external air may be introduced or internal air may be discharged. For example, the cigarette 2 may be packaged using one wrapper 24. As another example, the cigarette 2 may be doubly packaged using at least two wrappers 24. For example, the tobacco rod 21 may be packaged using a first wrapper 241, and the filter rod 22 may be packaged using wrappers 242, 243, 244. Also, the entire cigarette 2 may be packaged using a single wrapper 245. When the filter rod 22 includes a plurality of segments, each segment may be packaged using separate wrapper 242, 243, 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which includes tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity of the tobacco rod may be increased. As a result, the taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may generate a flavor or an aerosol. For example, the capsule 23 may have a configuration in which a liquid containing a flavoring material is wrapped with a film. For example, the capsule 23 may have a spherical or cylindrical shape, but is not limited thereto.

Figure 5:
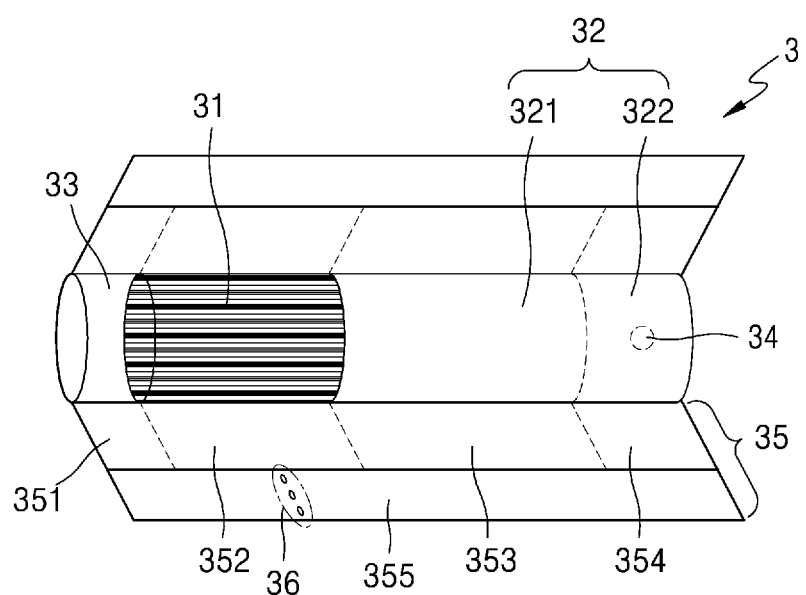

Referring to FIG. 5, the cigarette 3 may further include a front-end plug 33. The front-end plug 33 may be located on a side of the tobacco rod 42, the side not facing the filter rod 32. The front-end plug 33 may prevent the tobacco rod 31 from being detached outwards and prevent the liquefied aerosol from leaking into the aerosol generating device 1 from the tobacco rod 31, during smoking.

The filter rod 32 may include a first segment 321 and second segment 322. Here, the first segment 321 may correspond to a first segment of a filter rod 22 of FIG. 4, and the second segment 322 may correspond to a third segment of a filter rod 22 of FIG. 4.

The diameter and total length of the cigarette 3 may correspond to the diameter and total length of the cigarette 2 of FIG. 4. For example, the length of the front-end plug 33 may be about 7 mm, the length of the tobacco rod 31 may be about 15 mm, the length of the first segment 321 may be about 12 mm, and the length of the second segment 322 may be about 14 mm, but it is not limited thereto.

The cigarette 3 may be packaged using at least one wrapper 35. The wrapper 35 may have at least one hole through which external air may be introduced or internal air may be discharged. For example, the front-end plug 33 may be packaged using a first wrapper 351, and the tobacco rod 31 may be packaged using a second wrapper 352, and the first segment 321 may be packaged using a third wrapper 321, and the second segment 322 may be packaged using a fourth wrapper 354. Then, the entire cigarette 3 may be packaged using a fifth wrapper 355.

Also, the fifth wrapper 355 may have at least one hole 36. For example, the hole 36 may be formed in an area surrounding the tobacco rod 31, but is not limited thereto. The hole 36 may serve to transfer heat generated by the heater 13 to the inside of the tobacco rod 31.

Also, the second segment 322 may include at least one capsule 34. Here, the capsule 34 may generate a flavor and/or aerosol. For example, the capsule 34 may have a configuration in which a liquid containing a flavoring material is wrapped with a film. For example, the capsule 34 may have a spherical or cylindrical shape, but is not limited thereto.

Figure 6:
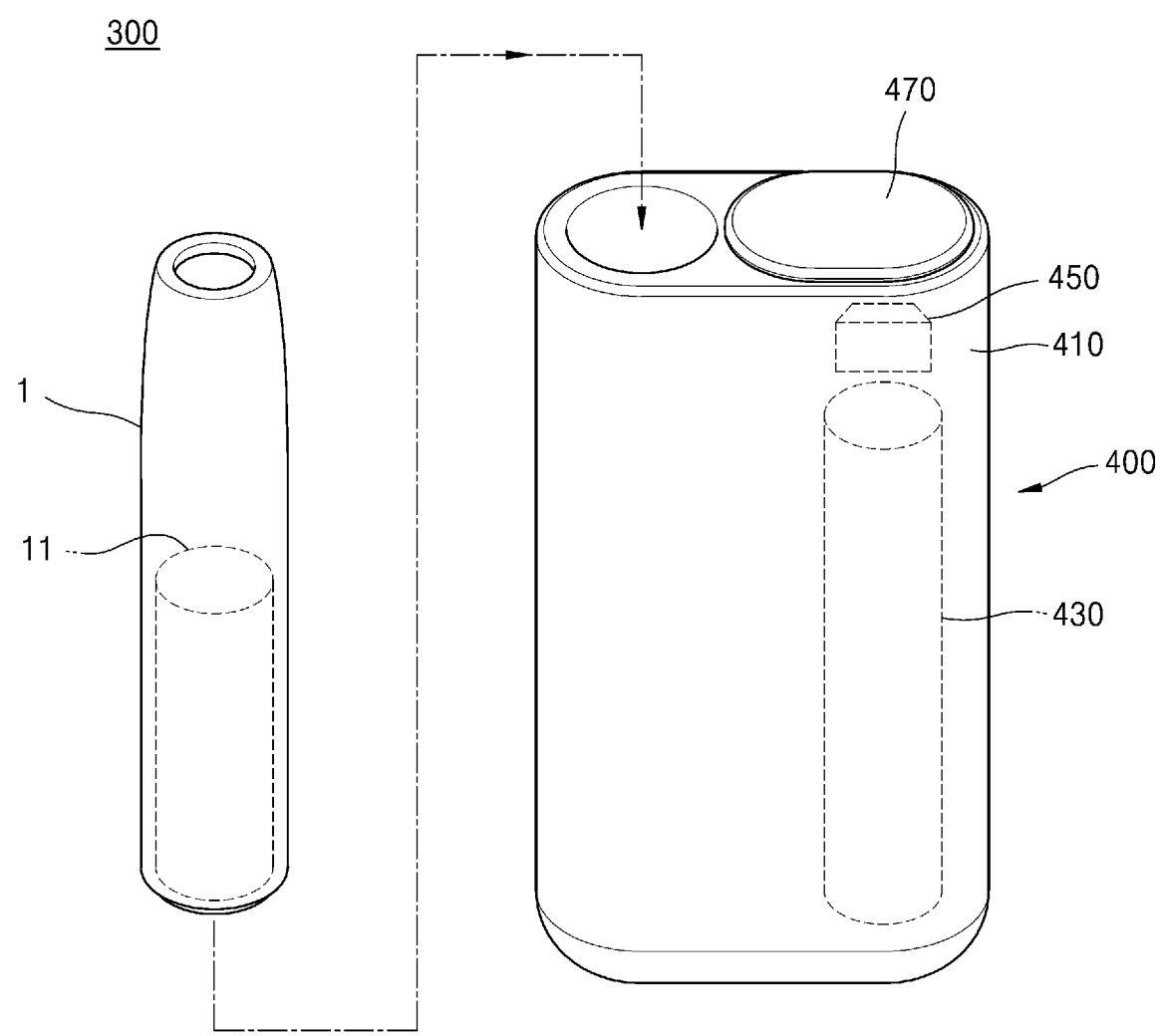
FIG. 6 is a view illustrating an aerosol recharging system according to an embodiment of the present disclosure.
Figure 7:
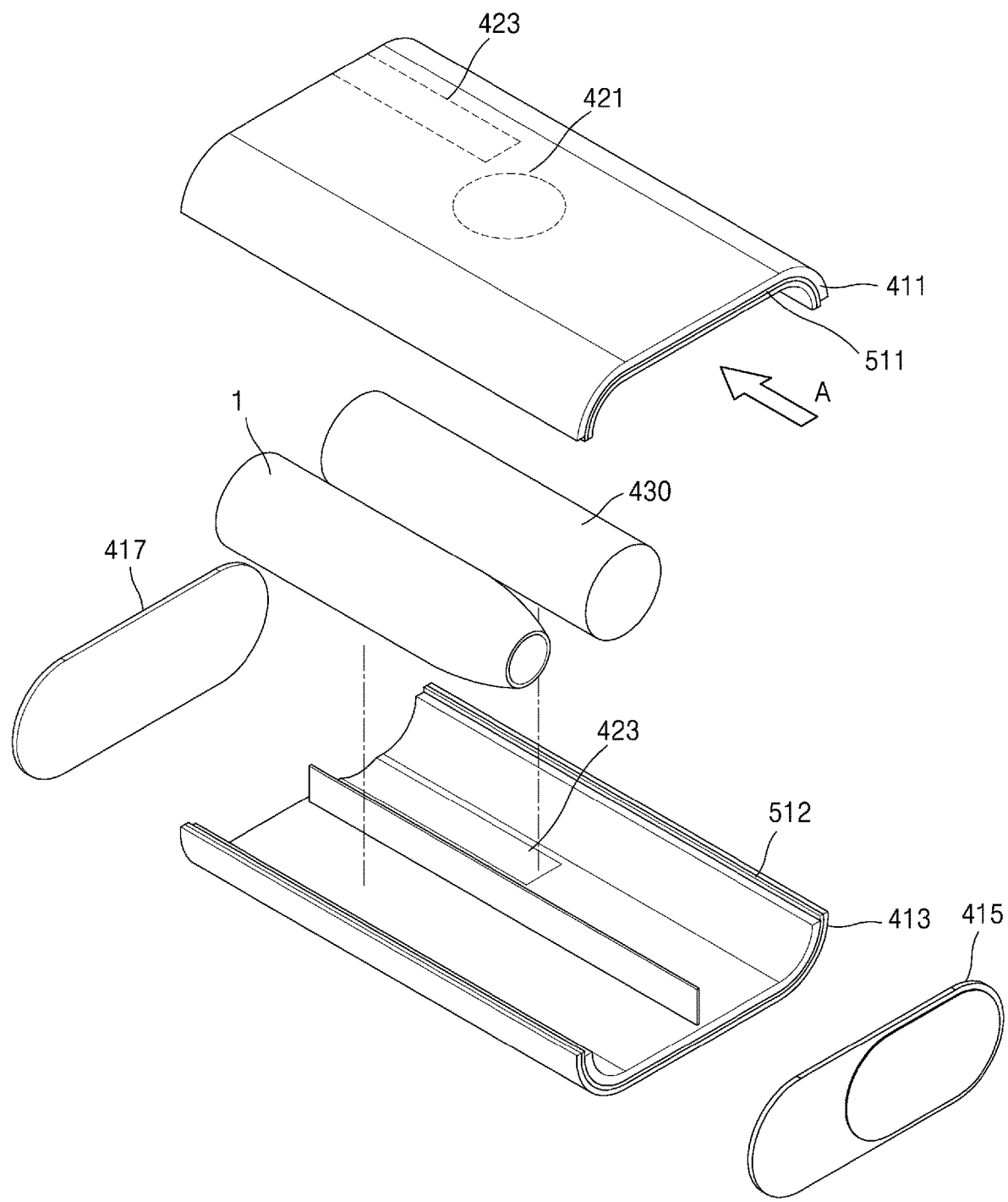
FIG. 7 is an exploded perspective view of an aerosol recharging system according to an embodiment of the present disclosure.

FIG. 6 is a view illustrating an aerosol recharging system according to an embodiment of the present disclosure, and FIG. 7 is an exploded perspective view of the aerosol recharging system according to an embodiment of the present disclosure.

As shown in FIGS. 6 and 7, an aerosol recharging system 300 according to an embodiment may include an aerosol generating device 1 and a power supply device 400 that supplies power to the aerosol generating device 1.

The aerosol generating device 1 may be any one of the aerosol generating devices 1 of FIGS. 1 to 3.

The power supply device 400 includes a first case 411 and a second case 413. In addition, the power supply device 400 further includes an inner space formed between the first case 411 and the second case 413. In addition, the power supply device 400 includes a third case 415 connected to one side of the first case 411 and one side of the second case 413, and a fourth case 417 connected to the other side of the first case 411 and the other side of the second case 413.

Each case includes a hook or a hook groove so that the cases may be fastened to each other. Alternatively, the cases may be bonded to each other by a bonding member. Alternatively, the cases may be fastened to each other by a screw method, a fitting method, or so on. However, the case fastening method according to the present disclosure is not limited to the above-described examples.

Inner surfaces of the first case 411 and the second case 413 are partitioned so that elements of the power supply device 400 may be mounted therein.

An insertion hole into which the aerosol generating device 1 is inserted is formed in the third case 415. In addition, a slide cover 470 for covering the insertion hole is formed in the third case 415.

When the slide cover 470 is opened, the aerosol generating device 1 may be accommodated in the inner space through the insertion hole. In addition, when the slide cover 470 is closed, the aerosol generating device 1 may be concealed in the power supply device 400.

The power supply device 400 may accommodate the aerosol generating device 1. In addition, the power supply device 400 may accommodate a battery 430 and a printed circuit board (PCB) 450. A controller (not illustrated) that controls an operation of the power supply device 400 may be mounted on the printed circuit board 450.

In order to distinguish between the battery 11 included in the aerosol generating device 1 and the battery 430 disposed in the power supply device 400, the battery 11 included in the aerosol generating device 1 may be referred to as a first battery 11 and the battery 430 included in the power supply device 400 may be referred to as a second battery 430.

The second battery 430 may supply power for recharging the first battery 11. In addition, the second battery 430 may supply power required for an operation of the heater 13 included in the aerosol generating device 1.

The controller (not illustrated) controls the overall operation of the power supply device 400. For example, the controller (not illustrated) may control an operation of the aerosol generating device 1 according to coupling and separation between the aerosol generating device 1 and the power supply device 400. The controller (not illustrated) may be mounted on the printed circuit board 450.

Meanwhile, when the aerosol generating device 1 is inserted into the inner space of the power supply device 400 for recharging, the residual heat generated by the heater 13 may be transferred to a surface of the power supply device 400.

Also, heat generated from the first battery 11 and/or the second battery 430 may be transferred to the surface of the power supply device 400.

Also, heat generated from a controller (not illustrated) included in the power supply device 400 may be transferred to the surface of the power supply device 400 via the printed circuit board 450.

Since a case of the aerosol generating device 1 is a region coming into direct contact with a hand of a user, serious problems such as thermal injury may be caused to the user if heat generated from the inside the power supply 400 is not safely shielded or dissipated.

In the related art, the heat dissipation member or the shield member is installed only in a location corresponding to a heat source, and thus, there is a problem that it is difficult to obtain a desirable heat dissipation performance or a desirable heat shield performance.

In addition, in the related art, the heat dissipation member or the shield member is exposed to an inner space, and thus, the internal components configuration element of the power supply device 400 are prone to damage.

In addition, in the related art, a process of forming the heat dissipation member or the shield member is disposed at the end of the manufacturing process the power supply device, and thus, it is difficult to install the heat dissipation member or the shield member.

In order to solve this problem, an embodiment disposes a plate between an inner surface and an outer surface of each case in such a way that the plate and the case are integrally formed. Also, when combining respective cases, ends of the respective plates are connected to each other. Accordingly, the aerosol generating device according to the present disclosure may completely dissipate or shield heat transferred from the inner space.

Figure 8A:
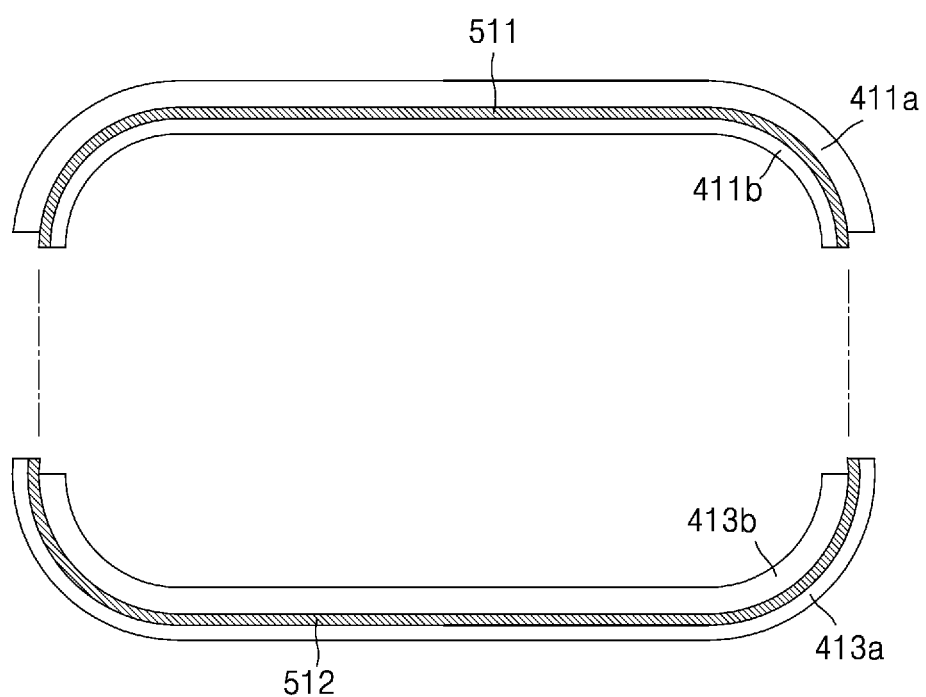
FIG. 8A is an exploded cross-sectional view according to a first embodiment of the present disclosure.
Figure 8B:
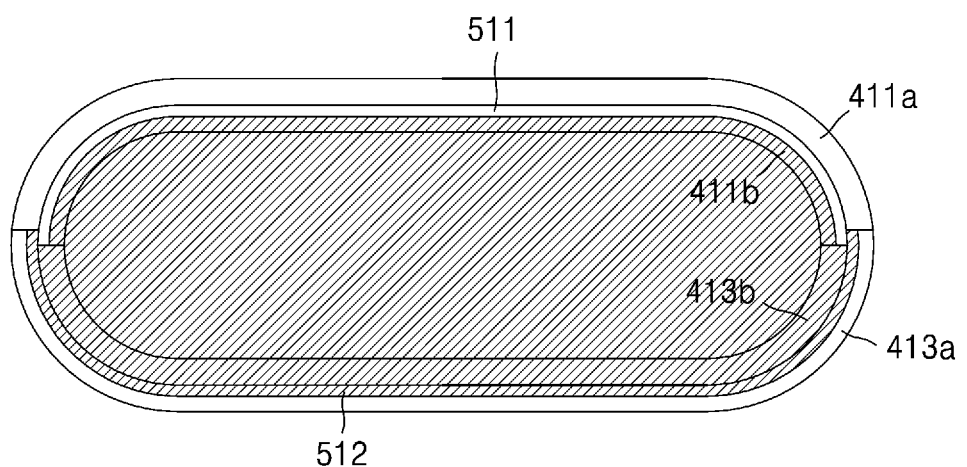
FIG. 8B is a combined cross-sectional view according to the first embodiment of the present disclosure.
Figure 9:
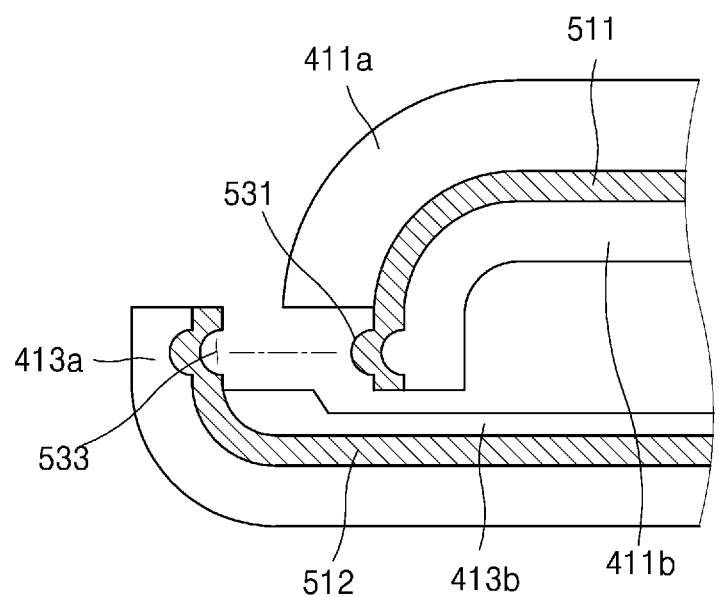
FIG. 9 is a view illustrating a combination of a first case and a second case, according to the first embodiment of the present disclosure.

FIG. 8A is an exploded cross-sectional view in "A" direction, according to a first embodiment of the present disclosure, FIG. 8B is a combined cross-sectional view in "A" direction, according to the first embodiment of the present disclosure, and FIG. 9 is a partial view of the first case and the second case, according to the first embodiment of the present disclosure.

Referring to FIGS. 8A, 8B, and 9, the first case 411 and the second case 413 are coupled to each other to form an inner space. For example, each of the first case 411 and the second case 413 may be formed of a composite of polycarbonate, and the present disclosure is not limited thereto.

A first plate 511 is disposed in the first case 411, and a second plate 512 is disposed in the second case 413. Each of the first plate 511 and the second plate 512 may be formed of a thermally conductive material. For example, each of the first plate 511 and the second plate 512 may be formed of aluminum, carbon steel, and/or stainless steel, or an alloy selected from the metal group. However, the present disclosure is not limited thereto.

In an embodiment, the first plate 511 may be molded between an outer surface 411a and an inner surface 411b of the first case 411 by an insert injection process. Likewise, the second plate 512 may be molded between an outer surface 413a and an inner surface 413b of the second case 413 by an insert injection process.

A coupling strengthening portion (not illustrated) for strengthening coupling to the first case 411 may be formed in the first plate 511.

Also, a coupling strengthening portion (not illustrated) for strengthening coupling to the second case 413 may be formed in the second plate 512.

For example, through injection molding, a through-hole may be formed in each of the first plate 511 and the second plate 512 so that an injection material enters during injection molding.

As another example, at least one coupling protrusion for coupling to the injection material may be formed in an upper surface or a lower surface of each of the first plate 511 and the second plate 512 during injection molding.

At least one end of the first plate 511 is exposed to the outside of the first case 411. At least one end of the second plate 512 is exposed to the outside of the second case 413. Although FIGS. 8A to 8B illustrate that both ends of each of the first plate 511 and the second plate 512 are exposed, only one of the both ends may be exposed according to an embodiment.

When the first case 411 and the second case 413 are coupled together, the exposed end of the first plate 511 and the exposed end of the second plate 512 are in contact with each other.

More specifically, when the first case 411 and the second case 413 are coupled together, the exposed end of the first plate 511 and the exposed end of the second plate 512 may overlap each other in the outward direction.

As the exposed end of the first plate 511 and the exposed end of the second plate 512 overlap each other in the outward direction, a side surface of the aerosol generating device 1, which comes into contact with a hand of a user most often, may completely dissipate or shield heat.

Meanwhile, as illustrated in FIG. 8B, the heat generated in inner spaces of the cases 411 and 413 are transferred to the plates 511 and 512 through the inner surfaces 411b and 413a, and then transferred to the outside through the outer surfaces 411a and 413a. At this time, since the plates 511 and 512 are thermally conductive materials, heat generated from a heat source is diffused in the plates 511 and 512. Since the exposed ends of the plates 511 and 512 overlap each other in the outward direction, a heat dissipation area is increased. As a result, the amount of heat reaching the outer surfaces 411a and 413b of the cases 411 and 413 may be reduced.

For ease of coupling of the first case 411 and the second case 413, one of the exposed ends of each of the first plate 511 and the second plate 512 may have a protrusion 531 extending in an outward direction, and the other end in contact with the exposed end may have a groove 533 accommodating the protrusion 531.

FIG. 9 illustrates that the exposed end of the first plate 511 has the protrusion 531, and the exposed end of the second plate 512 in contact with the exposed end of the first plate 511 has the groove 533.

However, it is also possible that the exposed end of the second plate 512 has the protrusion 531, and the exposed end of the first plate 511 in contact with the exposed end of the second plate 512 has the groove 533.

As the first plate 511 and/or the second plate 512 may include the protrusion 531 or the groove 533, the first case 411 and the second case 413 may be easily coupled to each other, and also, bonding between the first case 411 and the second case 413 is strengthened.

Meanwhile, at least one of the first plate 511 and the second plate 512 may include an exposure portion (423 in FIG. 7) exposed toward an inner space.

The exposure portion 423 is exposed toward the inner space at a location corresponding to a heat source that generates heat in the inner space. The heat source may include the heater 13, the first battery 11, the second battery 430, and/or the printed circuit board 450.

FIG. 7 illustrates that the exposure portion 423 are formed at the first case 411 and the second case 413 at a position corresponding to the second battery 430. However, the number and position of the exposure portion 423 may be changed according to the number of heat sources and an arrangement structure of the heat sources.

The exposed portion 423 transfers heat directly to the plates 511 and 512 without being obstructed by the inner surfaces 411b and 413b of the cases 411 and 413, so that the internal temperature can be reduced more quickly.

Figure 10A:
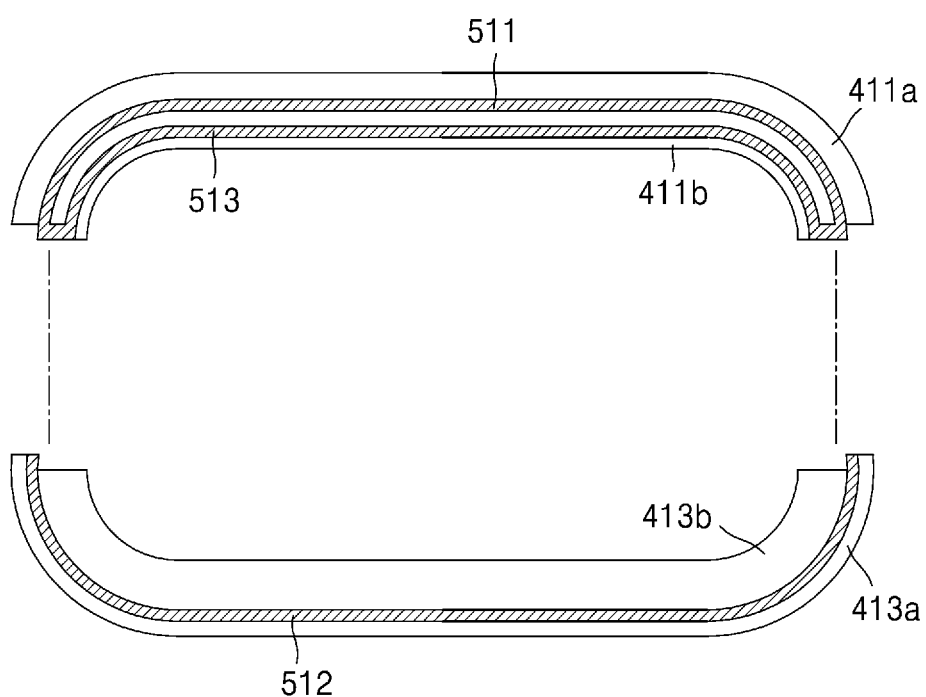
FIG. 10A is an exploded cross-sectional view according to a second embodiment of the present disclosure.
Figure 10B:
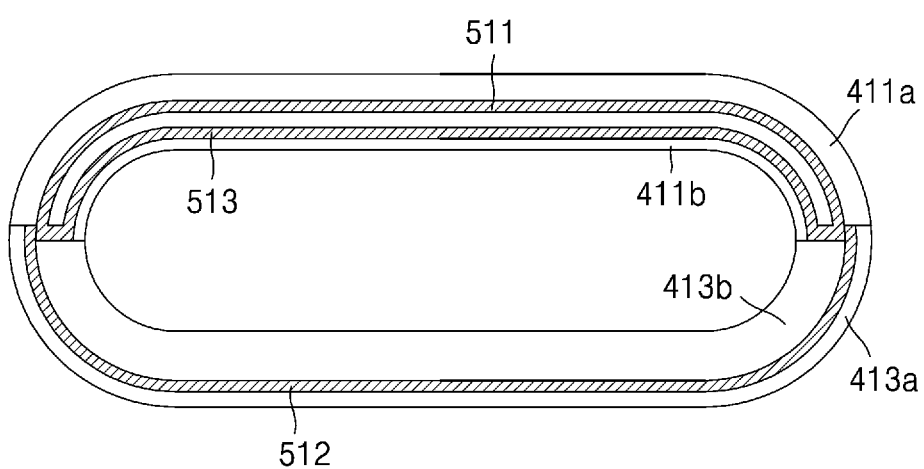
FIG. 10B is a combined cross-sectional view according to the second embodiment of the present disclosure.

FIG. 10A is an exploded cross-sectional view in "A" direction, according to a second embodiment of the present disclosure, and FIG. 10B is a combined cross-sectional view (A direction) according to the second embodiment of the present disclosure.

The second embodiment is different from the first embodiment in that the first case 411 includes a third plate 513, such that an inner air layer may be formed between the first plate 511 and the third plate 513.

In more detail, the first plate 511 and the third plate 513 may be connected to each other at one end.

Figure 12A:
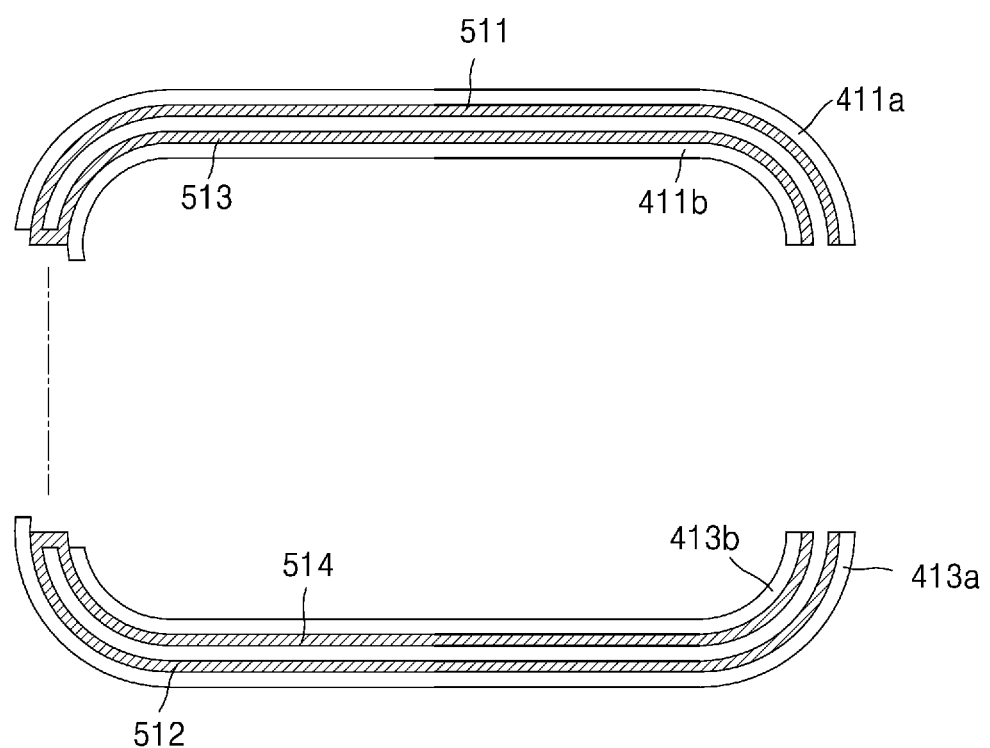
FIG. 12A is an exploded cross-sectional view according to a fourth embodiment of the present disclosure.
Figure 12B:
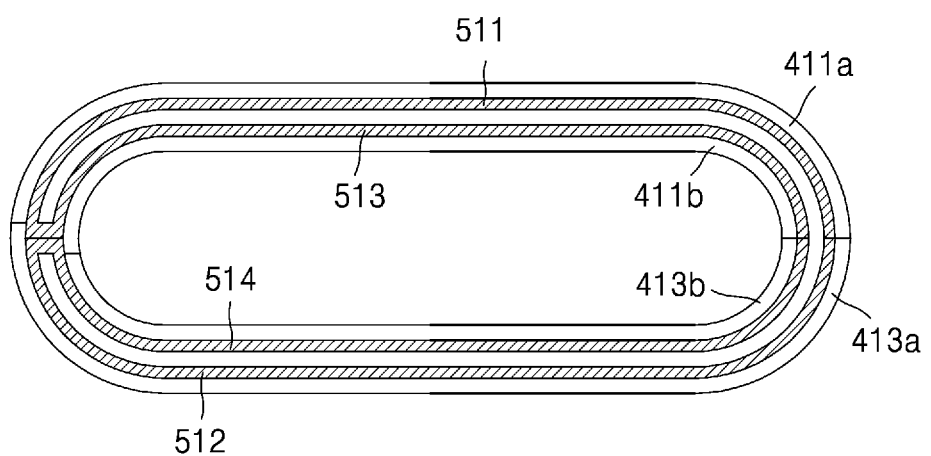
FIG. 12B is a combined cross-sectional view according to the fourth embodiment of the present disclosure.

Although FIGS. 10A to 10B illustrate that the first plate 511 and the third plate 513 are connected to each other at both ends, embodiments are not limited thereto. For example, the first plate 511 and the third plate 513 may be connected to each other only at one end, as illustrated in FIGS. 12A and 12B.

The third plate 513 may be formed of a thermally conductive material and may be formed integrally with the first plate 511. In addition, when the first case 411 is molded, the first plate 511 and the third plate 513 may be formed between the outer surface 411a and the inner surface 413b of the first case 411 by an insert injection process.

Since an inner air layer has to be formed between the first plate 511 and the third plate 513, a through-hole is not formed in the first plate 511 and the third plate 513.

However, at least one coupling protrusion for strengthening coupling power to the first case 411 may be formed in the first plate 511 and/or the third plate 513.

The connected portion where the ends of the first plate 511 and the third plate 513 meet may be exposed to the outside of the first case 411. Although FIGS. 10A to 10B illustrate that the connected portions at both ends are exposed to the outside of the first case 411, only one of the connected portions may be exposed according to an embodiment.

As shown in FIG. 10B, if the first case 411 and the second case 413 are coupled to each other, the connected portion of the first plate 511 and the third plate 513 are may be connected to the inner surface 413b of the second case 413, and overlap the second plate 512 in the outward direction.

In this case, the ends of the first plate 511 and the second plate 512 overlap and contact each other. As a result, a side surface of the aerosol generating device 1, which comes into contact with a hand of a user most often, may completely dissipate or shield heat.

Meanwhile, since the power supply device 400 according to the second embodiment includes an inner air layer of the first case 411, the power supply device 400 according to the second embodiment has a heat dissipation effect or a heat shield effect better than the power supply device 400 according to the first embodiment.

Meanwhile, the first case 411 may be closer to a heat source that generates heat in an inner space than the second case 413. By disposing an inner air layer on the side closer to the heat source, the heat dissipation effect or the heat shield effect may be maximized, and a manufacturing cost is reduced compared to designing all cases with a double heat dissipation structure including the inner air layer.

The power supply device 400 according to the second embodiment may include the protrusion 531 and the groove 533 shown in FIG. 9. In this case, the protrusion 531 or the groove 533 may be formed on an outer surface of the first plate 511 or an inner surface of the second plate 512.

In addition, the power supply device 400 according to the second embodiment may include the exposure portion 423 shown in FIG. 7. In this case, the exposure portion 423 may be formed on the second plate 512.

Figure 11A:
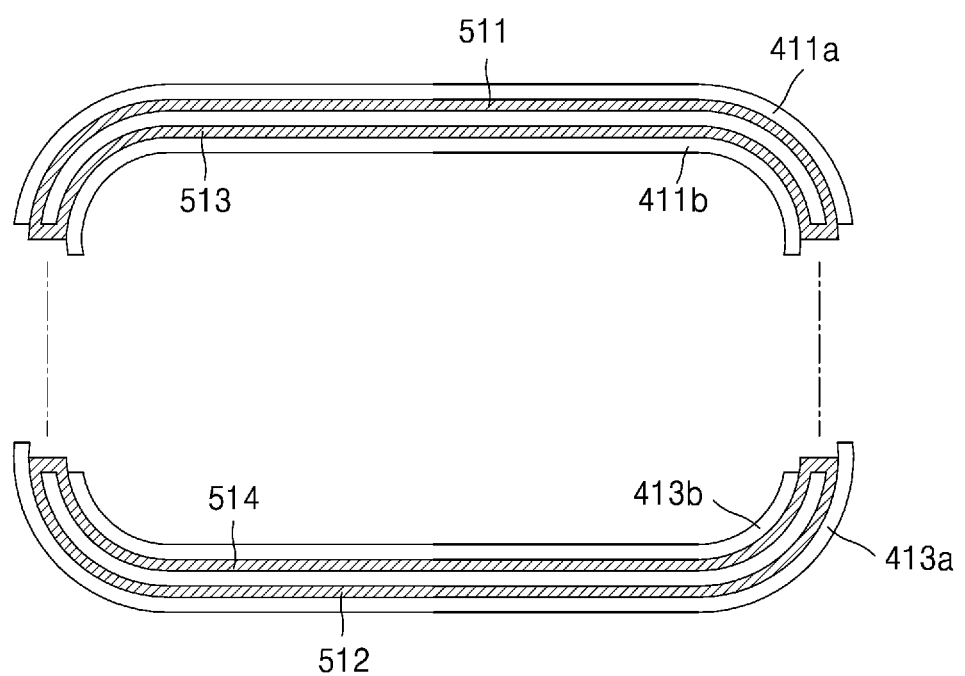
FIG. 11A is an exploded cross-sectional view according to a third embodiment of the present disclosure.
Figure 11B:
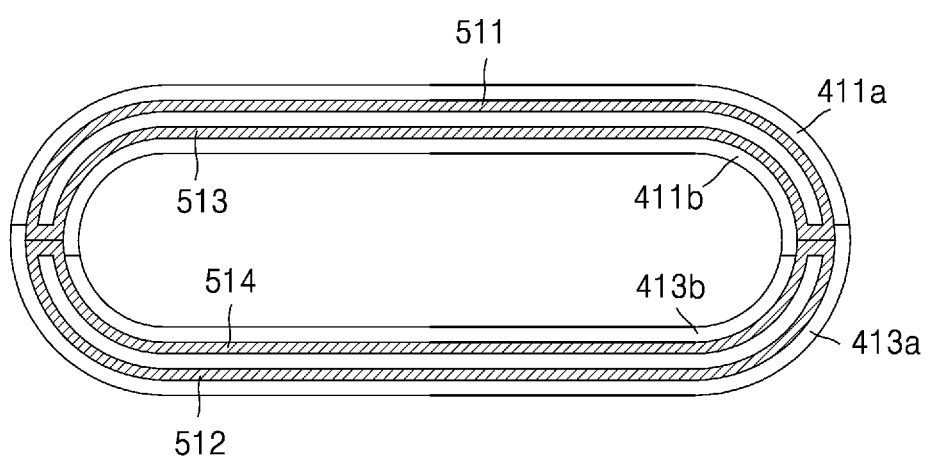
FIG. 11B is a combined cross-sectional view according to the third embodiment of the present disclosure.

FIG. 11A is an exploded cross-sectional view according to a third embodiment of the present disclosure, and FIG. 11B is a combined cross-sectional view according to the third embodiment of the present disclosure.

The third embodiment is different from the second embodiment in that the second case 413 includes an inner air layer as well as the first case 411.

In more detail, the recharging system 300 of the aerosol generating device 1 according to the third embodiment of the present disclosure further include a fourth plate 514 which is disposed in the second case 413 such that an inner air layer is formed between the second plate 512 and the fourth plate 514.

The second plate 512 and the fourth plate 514 may be connected to each other at one or both ends. FIGS. 11A and 11B illustrate that both ends of the second plate 512 and both ends of the fourth plate 514 are connected to each other, but only one of the both ends of the second plate 512 and only one of the both ends of the fourth plate 514 may be connected to each other as illustrated in FIGS. 12A and 12B.

The fourth plate 514 may be formed of a thermally conductive material and may be formed integrally with the second plate 512. In addition, the second plate 512 and the fourth plate 514 may be formed between the outer surface 413*a* and the inner surface 413*b* of the second case 413 by an insert injection process.

Since an inner air layer has to be formed between the second plate 512 and the fourth plate 514, no through-hole is formed in the second plate 512 and the fourth plate 514.

However, each of the second plate 512 and the fourth plate 514 may be formed with at least one coupling protrusion for strengthening coupling power to the second case 413.

The connected portion where the ends of the second plate 512 and the fourth plate 514 meet may be exposed to the outside of the second case 413. Although FIGS. 11A to 11B illustrate that the connected portions at both ends are all exposed, only one of the connected portions may be exposed according to an embodiment.

If the first case 411 is coupled to the second case 413, the connected portion of the first plate 511 and the third plate 513 are in contact with the connected portion of the second plate 512 and the fourth plate 514.

In this case, since the respective exposed ends are in contact with each other, a side surface of the aerosol generating device 1, which comes into contact with a hand of a user most often, may completely dissipate or shield heat.

Meanwhile, since the power supply device 400 according to the third embodiment includes an inner air layer in an entirety of the side case, the power supply device 400 according to the third embodiment has a heat dissipation effect or a heat shield effect better than the power supply devices 400 according to the first and second embodiments.

Meanwhile, the power supply device 400 according to the third embodiment may not include the exposure portion 423 because both the first case 411 and the second case 413 have to include an inner air layer.

FIG. 12A is an exploded cross-sectional view according to a fourth embodiment of the present disclosure, and FIG. 12B is a combined cross-sectional view according to the fourth embodiment of the present disclosure.

The fourth embodiment is different from the third embodiment in that the connected portion of the first plate 511 and the third plate 513 and the connected portion of the second plate 512 and the fourth plate 514 are connected to each other at only one end.

The connected portion of the first plate 511 and the third plate 513 may be exposed to the outside of the first case 411.

The connected portion of between the second plate 512 and the fourth plate 514 is exposed to the outside of the second case 413.

If the first case 411 and the second case 413 are coupled to each other, the connected portion of the first plate 511 and the third plate 513 faces and is in contact with the connected portion of the second plate 512 and the fourth plate 514. In addition, at the opposite end, the first plate 511 and the third plate 513 are not connected to each other, but the first plate 511 and the third plate 513 are connected to the second plate 512 and the fourth plate 514, respectively. Thus, the inner air layer may be shared by the first case 411 and the second case 413.

Accordingly, the power supply device 400 according to the third embodiment has a heat dissipation effect or a heat shield effect better than the power supply devices 400 according to the first to fourth embodiments.

Meanwhile, in the power supply device 400 according to the fourth embodiment, the first case 411 and the second case 413 have to share the inner air layer, and thus, a through-hole is not formed.

However, each of the first plate 511 and the third plate 513 may be formed with at least one coupling protrusion for strengthening coupling power to the first case 411. Likewise, at least one coupling protrusion for strengthening coupling power to the second case 413 may be formed in each of the second plate 512 and the fourth plate 514.

Meanwhile, the power supply device 400 according to the fourth embodiment does not include the exposure portion 423 because the first case 411 and the second case 413 have to share the inner air layer.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is illustrated in the claims rather than the foregoing description, and all differences within the equivalent scope should be interpreted as being included in the present disclosure.

What is claimed is:

1. A recharging system for an aerosol generating device comprising:

an aerosol generating device that generates aerosol by heating an aerosol generating material; and a power supply device having an inner space into which the aerosol generating device is inserted, wherein the power supply device comprises:

a first case;

a second case coupled to the first case to form the inner space;

a first plate that is disposed in the first case; and
a second plate that is disposed in the second case,
wherein the first plate and the second plate are formed of a thermally conductive material, and
wherein at least one end of the first plate is exposed to an outside of the first case and at least one end of the second plate is exposed to an outside of the second case, such that the exposed end of the first plate and the exposed end of the second plate are in contact with each other based on the first case and the second case being coupled to each other,
wherein the first plate is molded between an outer surface and an inner surface of the first case by an insert injection process,
wherein the second plate is molded between an outer surface and an inner surface of the second case by the insert injection process, and
wherein each of the first plate and the second plate includes a coupling protrusion coupled to an injection material during injection molding on an upper surface or a lower surface.

2. The recharging system for the aerosol generating device of claim 1, wherein the exposed end of the first plate and the exposed end of the second plate overlap each other in an outward direction based on the first case and the second case being coupled to each other.

3. The recharging system for the aerosol generating device of claim 1, wherein the exposed end of the first plate includes a protrusion extending in an outward direction, and the exposed end of the second plate includes a groove accommodating the protrusion.

4. The recharging system for the aerosol generating device of claim 1, further comprising a third plate disposed in the first case such that an inner layer is formed between the first plate and the third plate,
wherein the exposed end of the first plate is connected to the third plate, such that a connected portion of the first plate and the third plate is connected to the second case and overlaps the second plate in an outward direction based on the first case and the second case being coupled to each other.

5. The recharging system for the aerosol generating device of claim 1, further comprising:
a third plate disposed in the first case such that an inner layer is formed between the first plate and the third plate; and
a fourth plate disposed in the second case such that an inner layer is formed between the fourth plate and the second plate,
wherein the exposed end of the first plate is connected to the third plate and the exposed end of the second plate is connected to the fourth plate, such that a connected portion of the first plate and the third plate is in contact with a connected portion of the second plate and the fourth plate based on the first case and the second case being coupled to each other.

6. The recharging system for the aerosol generating device of claim 1, wherein at least one of the first plate and the second plate comprises an exposure portion that is exposed to the inner space at a location corresponding to a heat source.

7. The recharging system for the aerosol generating device of claim 1, wherein each of the first plate and the second plate has a through-hole that allows an injection material to enter during injection molding.

* * * * *